United States Patent
Nesiba et al.

(10) Patent No.: US 11,741,958 B2
(45) Date of Patent: Aug. 29, 2023

(54) USING STRUCTURED AUDIO OUTPUT TO DETECT PLAYBACK AND/OR TO ADAPT TO MISALIGNED PLAYBACK IN WIRELESS SPEAKERS

(71) Applicant: Google LLC, Mountain View, CA (US)

(72) Inventors: Nathaniel Nesiba, Mountain View, CA (US); Xiang Cao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/404,673

(22) Filed: Aug. 17, 2021

(65) Prior Publication Data

US 2021/0375287 A1 Dec. 2, 2021

Related U.S. Application Data

(63) Continuation of application No. 16/618,723, filed as application No. PCT/US2019/017647 on Feb. 12, 2019, now Pat. No. 11,100,931.

(Continued)

(51) Int. Cl.
*G10L 15/22* (2006.01)
*H04W 4/80* (2018.01)
(Continued)

(52) U.S. Cl.
CPC .......... *G10L 15/22* (2013.01); *B60R 16/0373* (2013.01); *H04M 1/6091* (2013.01);
(Continued)

(58) Field of Classification Search
CPC ....... G10L 15/20; G10L 15/22; G10L 15/063; G10L 2021/02087; G10L 21/0208;
(Continued)

(56) References Cited

U.S. PATENT DOCUMENTS 5,546,468 A * 8/1996 Beard ................. B60R 11/0217
381/86
6,850,512 B1 2/2005 Bishop et al.
(Continued)

FOREIGN PATENT DOCUMENTS

CN 102883239 1/2013
EP 2368767 9/2011
(Continued)

OTHER PUBLICATIONS

European Patent Office; Communication Under Rule 71(3) EPC issued in Application No. 19707586.4; 47 pages; dated Mar. 1, 2021.
(Continued)

*Primary Examiner* — Leshui Zhang
(74) *Attorney, Agent, or Firm* — Gray Ice Higdon

(57) ABSTRACT

Implementations are directed to causing a computing device to transmit an audio data stream, via a communication channel, to a vehicle computing device of a vehicle. Various implementations include one or more vehicle speakers driven by the vehicle computing device to render audible output. Additionally or alternatively, various implementations include determining whether the audible output is captured by at least one microphone of a vehicle interface device within the vehicle. In many implementations, the vehicle interface device is communicatively coupled to the computing device.

12 Claims, 8 Drawing Sheets

Related U.S. Application Data

(60) Provisional application No. 62/798,252, filed on Jan. 29, 2019.

(51) Int. Cl.
*B60R 16/037* (2006.01)
*H04M 1/60* (2006.01)
*H04S 7/00* (2006.01)
*G10L 21/0208* (2013.01)

(52) U.S. Cl.
CPC ................ *H04S 7/30* (2013.01); *H04W 4/80* (2018.02); *G10L 2021/02087* (2013.01)

(58) Field of Classification Search
CPC ............. G10L 21/3608; G10L 19/018; B60R 16/0373; B60R 16/037; H04M 1/6091; H04M 1/60; H04S 7/30; H04S 7/00; H04W 4/80; H04W 4/10; G06F 3/167; G06F 3/165; G06F 3/162; G06F 3/16; H04R 29/001; H04R 29/00; H04R 2499/13
USPC ..... 704/275, 270.1; 381/302, 85, 86, 92, 74, 381/56, 58, 312–321, 93, 94.7, 94.8, 94.9, 381/95, 96, 123, 122; 700/94; 455/418, 455/419, 420, 423, 569.1, 569.2, 575.3
See application file for complete search history.

(56) References Cited

U.S. PATENT DOCUMENTS

| | | | |
|---|---|---|---|
| 9,165,567 | B2 | 10/2015 | Visser et al. |
| 10,009,862 | B1 | 6/2018 | Malovany et al. |
| 11,100,931 | B2 | 8/2021 | Nesiba et al. |
| 2007/0110251 | A1 | 5/2007 | Krantz et al. |
| 2007/0281648 | A1* | 12/2007 | Rokusek ............. H04M 1/6091 455/206 |
| 2009/0298474 | A1* | 12/2009 | George ................... G10L 13/00 455/412.2 |
| 2011/0098917 | A1 | 4/2011 | LeBeau et al. |
| 2013/0222210 | A1 | 8/2013 | Wang et al. |
| 2016/0029141 | A1 | 1/2016 | Harma |
| 2016/0259623 | A1 | 9/2016 | Sumner et al. |
| 2017/0344336 | A1 | 11/2017 | Lotfizadeh |

FOREIGN PATENT DOCUMENTS

| | | |
|---|---|---|
| GB | 2496249 | 5/2013 |
| JP | 2005079614 | 3/2005 |
| JP | 3210980 | 6/2017 |
| JP | 2017212660 | 11/2017 |
| WO | 2017204854 | 11/2017 |
| WO | 2020027828 | 2/2020 |

OTHER PUBLICATIONS

European Patent Office; International Search Report and Written Opinion issued in Application No. PCT/US2019/017647; 19 pages; dated Dec. 18, 2019.
Gonyou, Stacy, "Car Assistant"; Technical Disclosure Commons; https://www.tdcommons.org/dpubs_series/1493; 9 pages; Sep. 7, 2018.
European Patent Office; Invitation to Pay Additional Fees issued in Application No. PCT/US2019/017647; 14 pages; dated Oct. 25, 2019.
Korean Patent Office; Notice of Allowance issued in Application No. 1020217023438; 3 pages; dated Aug. 24, 2021.
European Patent Office; Communication issued in Application No. 21179150.4; 10 pages; dated Nov. 4, 2021.
Japanese Patent Office; Notice of Reasons for Rejection issued in Application No. 2021-541104, 9 pages, dated Feb. 21, 2022.
Korean Patent Office; Notice of Office Action issued in Application No. 1020217038000; 10 pages; dated Apr. 4, 2023.
European Patent Office; Communication pursuant Article 94(3) EPC issued in Application No. 21179150.4; 5 pages; dated Jun. 9, 2023.

* cited by examiner

USING STRUCTURED AUDIO OUTPUT TO DETECT PLAYBACK AND/OR TO ADAPT TO MISALIGNED PLAYBACK IN WIRELESS SPEAKERS

BACKGROUND

Humans may engage in human-to-computer dialog with interactive software applications referred to herein as "automated assistants" (also referred to as "digital agents", "chatbots", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual interface output.

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant", "OK Assistant", and/or "Assistant" can be spoken to invoke the automated assistant.

A user may wish to interact with an automated assistant while in a vehicle. For example, a user can invoke an automated assistant of a mobile smartphone to request driving directions. Furthermore, a client device (such as a mobile smartphone) can be communicatively coupled with the vehicle such that audio data provided by the client device can be rendered via one or more vehicle speakers. For example, a mobile smartphone can be communicatively coupled with a vehicle via Bluetooth, and audio data from the mobile smartphone can be transmitted, via Bluetooth, to a vehicle computing device and rendered by the vehicle computing device via vehicle speaker(s). This audio data can include natural language responses provided to the mobile smartphone by an automated assistant.

However, many vehicle computing devices, under one or more conditions, will fail to render, via vehicle speaker(s), the entirety of audio data that is transmitted by the mobile smartphone. For example, some vehicle computing device(s) may receive the entirety of the audio data, but will not render an initial portion of the audio data via the speakers due to, for example, delay in initiating component(s) for rendering of the audio data. Accordingly, the initial portion of the audio data will fail to render via the vehicle speakers. For example, the audio data can include synthesized speech of "Turn left onto Main Street", but the vehicle computing device will render only "onto Main Street". This is problematic as the relevant "Turn left" isn't rendered, forcing a user to activate a display of the mobile smartphone to ascertain a turning direction and/or causing the user to inadvertently turn the wrong direction "onto Main Street". Both of these scenarios lead to waste of computational resources. Additionally or alternatively, many vehicle computing devices will fail to render, via vehicle speaker(s), any audio data that is transmitted by the mobile smartphone when the vehicle computing device is not in the appropriate mode (e.g., a Bluetooth mode). This results in a wasteful transmission of the audio data, as it is not actually rendered via the vehicle speaker(s)—and can cause a user to request the audio data be retransmitted after manual switching to the appropriate mode.

SUMMARY

Implementations described herein are directed to determining an audio delay between a computing device and one or more additional speakers (e.g., vehicle speakers) driven by an additional computing device (e.g., vehicle computing device), where the computing device and the additional computing device are communicatively coupled via a wireless communications channel. In some versions of those implementations, a corresponding delay audio segment, that has a duration determined using the audio delay, is appended to an additional audio stream transmitted to the additional computing device. Appending the delay audio segment to the additional audio stream causes at least part of the delay audio segment to not be rendered by the additional speaker(s), but ensures the additional audio stream is rendered by the additional speaker(s). In some versions of those implementations, the audio delay is additionally or alternatively utilized to adapt noise reduction of the computing device and/or of a further computing device. For example, the noise reduction that is adapted can be a noise cancellation filter that filters, from captured audio data (captured via microphones), audio data that it knows is being provided for rendering via the additional speaker(s), and can utilize the audio delay to accurately determine anticipated timing for the actual rendering of the audio data via the additional speaker(s).

Implementations described herein are additionally and/or alternatively directed to determining if an audio data stream transmitted to an additional computing device (e.g., vehicle computing device) for rendering through one or more additional speakers (e.g., vehicle speakers) driven by the additional computing device—is actually being rendered through the additional speaker(s). If so, additional audio data can be transmitted to the additional computing device for rendering through the additional speaker(s) (under the assumption it will likewise be rendered through the additional speaker(s)). If not, the additional audio data can instead be rendered using alternative speaker(s) not driven by the additional computing device. In these and other manners, the additional audio data can be transmitted for rendering via vehicle speaker(s), when it is determined prior transmitted audio data was actually rendered via the vehicle speaker(s). However, the additional audio data can instead be rendered via alternative speaker(s), when it is determined prior transmitted audio data was not actually render via the vehicle speakers. This can ensure that the audio data is actually rendered and perceptible to a user, which prevents the user from having to request retransmitting and/or another attempted rendering of the audio data. Further, this can optionally ensure that transmissions of audio data to the additional computing device occur only when it is determined it will be audibly rendered by the additional computing device.

As one example, a smartphone can be communicatively coupled with a vehicle computing device via Bluetooth, and the smartphone can transmit audio data to the vehicle computing device for rendering via speaker(s) of the vehicle. For instance, an automated assistant client of the smartphone can generate the audio data in response to a request from a user, and can cause the audio data to be transmitted to the vehicle computing device responsive to the request.

In many implementations, audio data transmitted from a computing device for rendering by the vehicle computing device using vehicle speaker(s) can experience a delay of up to several seconds before the audio data is rendered via the vehicle speakers. For example, when the vehicle computing device switches to a Bluetooth mode, a portion (e.g., 1 second, 1.5 seconds, etc.) of audio data transmitted to the vehicle computing device can fail to render at the vehicle speaker(s). In many implementations, this portion of audio data is received by the vehicle computing device, but is discarded by the vehicle computing device (i.e., the vehicle computing device discards any received portions of the audio data stream until the vehicle computing device is in Bluetooth mode). As a result, pertinent portion(s) of audio data are not rendered at all via the vehicle speakers, despite being intended to be rendered via the vehicle speakers. This can be problematic for various audio data, such as audio data that captures natural language responses generated using an automated assistant client. Such natural language responses are often short, and relevant portion(s) (or the entirety) of the natural language response can fail to render via the vehicle speaker(s).

In many implementations, the audio delay between the computing device and the vehicle computing device can be automatically determined, and a delay audio segment whose size is determined based on the length of the delay can be appended to future audio data. For example, a client device can determine a 0.5 second delay in audio data transmitted to a vehicle computing device, and therefore can append a delay audio segment, that includes 0.5 seconds of delay audio, to the beginning of future audio data streams transmitted to the vehicle computing device. In this manner, although the delay audio segment won't be rendered (at least not in full), appending the delay audio segment to a future audio data stream ensures that the entirety of the future audio stream will be rendered. Audio delays can occur at the beginning of an audio data stream, at the end of an audio data stream, or at both the beginning and the end of the audio data stream. As such, delay audio segment(s) can be appended to the beginning, the end, or both the beginning and the end of audio data streams.

To determine a vehicle audio delay, a computing device can transmit a known sequence of audio data to the vehicle computing device. The vehicle computing device can render the audio data using one or more vehicle speakers, and the computing device can capture the rendering of the audio data. For example, a mobile smartphone can transmit an audio data stream to a vehicle computing device, and can capture audio output generated using the speaker(s) of the vehicle. By comparing the captured audio data with the known audio data stream, the computing device can determine the vehicle audio delay. This sequence of audio data can be audible to a user, inaudible to a user (e.g., high frequency audio), and/or a combination of audible and inaudible audio data. For example, an audio data stream can include a segment of audio data at a single frequency of a known length. A client device can compare the length of the captured audio data with the known length of the audio data stream to determine a delay. Additionally and/or alternatively, an audio data stream can include a sequence of frequency segments. The sequence of captured frequency segments can be compared with the transmitted sequence of frequency segments to determine the delay. In a variety of implementations, background noise can interfere with capturing audio output rendered using vehicle speaker(s) (i.e., traffic outside the vehicle, people speaking within the vehicle, etc. can interfere with capturing audio output). An audio data stream can include a sequence of co-occurring frequency segments (e.g., dual tone frequency segments, tri tone frequency segments, quad tone frequency segments, etc.). In many cases, a computing device can still capture at least one frequency in the co-occurring frequency segments in spite of the background noise. In a variety of implementations, audio data used to determine a vehicle audio delay is a sequence of dual tone multi frequency (DTMF) audio.

In various implementations, a vehicle interface device can additionally be communicatively coupled with the computing device. A vehicle interface device can provide additional and/or alternative user interface input(s) and/or user interface output(s) such as additional microphone(s) and/or additional speaker(s). For example, a vehicle interface device can be communicatively coupled with the computing device via Bluetooth, and can include one or more additional microphone(s) to capture audio output of the vehicle speaker(s) as well as utterances spoken by a user. In several implementations, microphone(s) of the vehicle interface device can be in a better position and/or better suited to capture audio output than microphone(s) of the computing device. For example, a user can have their mobile smartphone in a backpack while driving, and the backpack can prevent microphone(s) of the mobile smartphone from capturing as much audio output as microphone(s) of the vehicle interface device (which are not obstructed by the backpack). As another example, the vehicle interface device can include far-field microphone(s) that can be better equipped to capture various utterances in the vehicle, whereas a smartphone may lack far-field microphone(s). Additionally or alternatively, a vehicle interface device can detect the spoken invocation of an invocation phrase, and transmit audio data to the computing device after the detection of the invocation phrase.

In many implementations, a client device can transmit an audio data stream to a vehicle computing device to determine whether the audio data stream is actually rendered using one or more vehicle speakers. If the client device (or a vehicle interface device communicatively coupled with the client device) does not capture (via microphone(s)) any audio data output that corresponds to the audio data stream, the client device can render a future audio data stream using alternative speakers (e.g., client device speaker(s), vehicle interface device speaker(s), etc.). On the other hand, if audio data output is captured that corresponds to the audio data stream, the client device can transmit the future audio data stream to the vehicle computing device for rendering via the vehicle speaker(s). In many implementations, a client device can transmit an audio data stream on a periodic basis (e.g., transmit the audio data stream every minute, every two minutes, every five minutes, etc.), or at other regular or non-regular intervals. Additionally or alternatively, a client device can determine whether to transmit the audio data stream based on the elapsed time since it last transmitted the audio data stream. For example, the client device will transmit an audio data stream if a threshold value of time has elapsed since the last transmission (e.g., the client device will transmit the audio data stream if it has been over 10 seconds since the last transmission, over 30 seconds since the last transmission, over 1 minute since the last transmission, etc.). In many implementations, a client device can transmit an audio data stream in response to detecting the invocation of an automated assistant (e.g., responsive to detecting a hotword or detecting actuation of an invocation button) while the automated assistant client is "busy" determining a response to the user provided input. In these and other manners, the client device can dynamically update its determination as to whether audio data streams should be provided for rendering via the vehicle speaker(s) or, instead, provided for rendering via alternative speaker(s).

In some implementations, a determined audio delay can additionally or alternatively be used with a variety of noise reduction techniques. For example, a user can provide the spoken input "OK Assistant, what time is it" to an automated assistant client, and the automated assistant client can formulate "It is 3:05 pm" as the response. A client device can transmit, to a vehicle computing device, an audio data stream that includes a text-to-speech conversion of "It is 3:05 pm", and the vehicle computing device can render the audio data stream via vehicle speaker(s). The client device and/or a separate vehicle interface device can utilize the transmitted audio data stream, and the determined audio delay, in cancelling, from captured audio data (captured via microphone(s)), the text-to-speech conversion of "It is 3:05 pm". In other words, knowledge of the audio data stream that is being rendered can be used to cancel out that audio data stream from captured audio data, to thereby enable any co-occurring spoken utterance of a user to be better recognized. The knowledge of the audio data stream is utilized along with the determined audio delay, to enable the noise cancellation to cancel out the audio data stream at the right time (e.g., to know that "It is 3:05 pm" will be actually rendered with a 1.2 second delay (or other delay)). For example, the client device can transmit the "It is 3:05 pm" audio stream to the vehicle interface device for use, by the vehicle interface device, in noise reduction. The vehicle interface device, using the audio stream and the vehicle audio delay, will know when the audio output will be rendered using vehicle speaker(s), and can filter "It is 3:05 pm" at the appropriate time out of any captured audio output transmitted to the client device.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
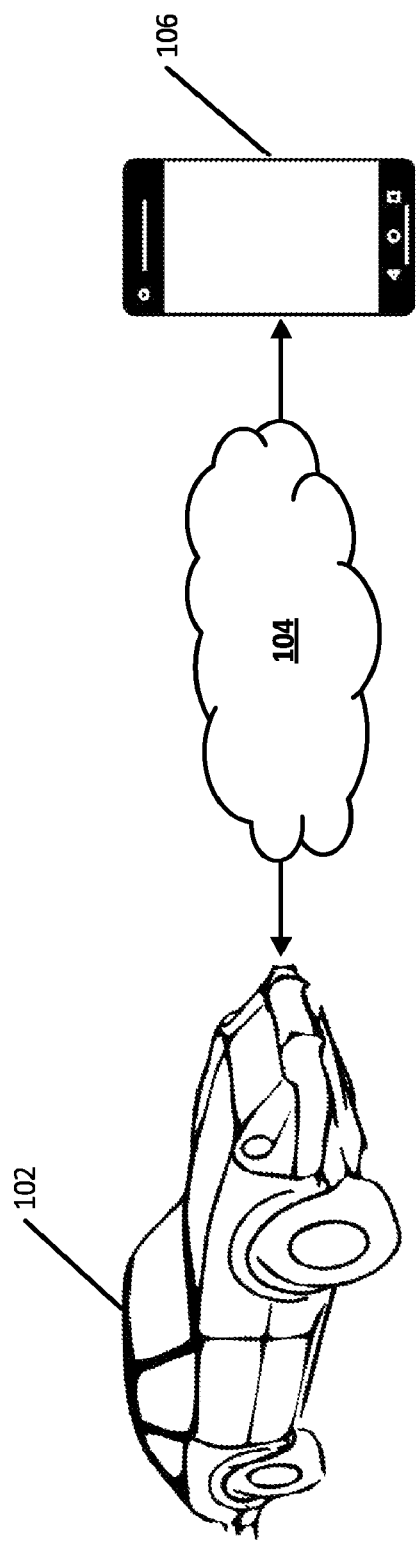
FIG. 1 illustrates an example environment where various implementations disclosed herein can be implemented.
Figure 2:
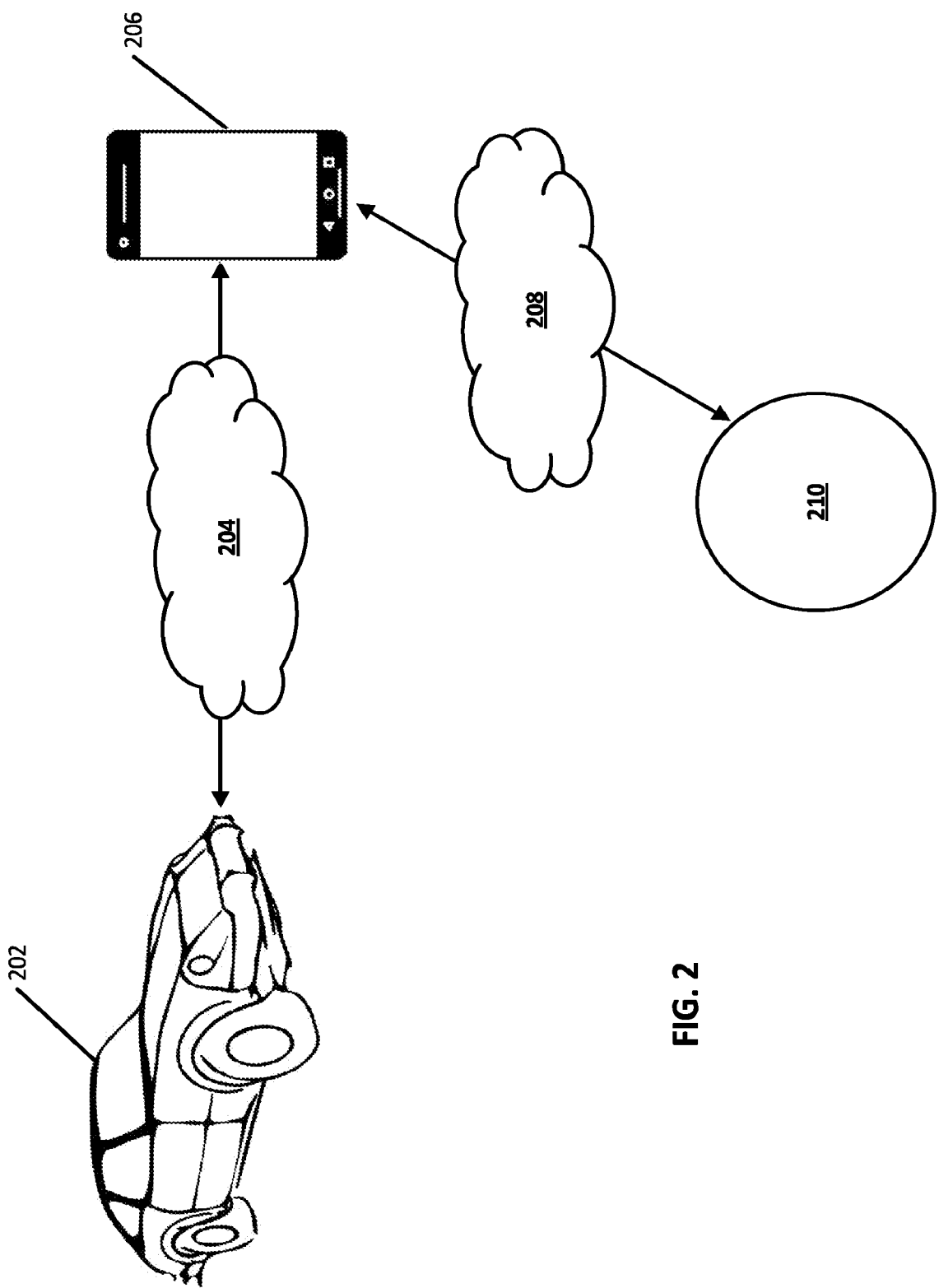
FIG. 2 illustrates another example environment where various implementations disclosed herein can be implemented.
Figure 3:
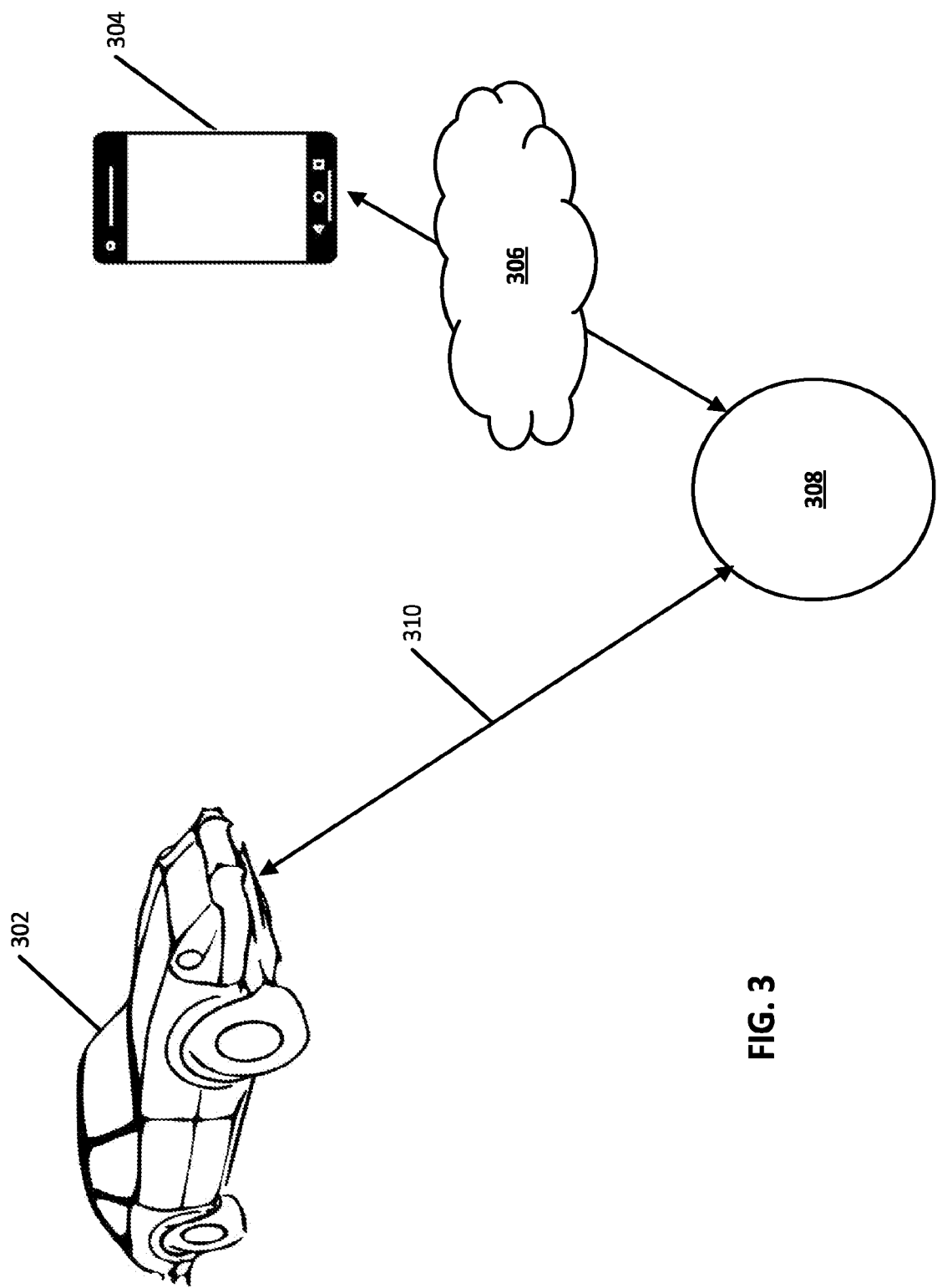
FIG. 3 illustrates another example environment where various implementations disclosed herein can be implemented.

FIG. 1, FIG. 2, and FIG. 3 illustrate a computing device communicatively coupled to a vehicle computing device in accordance with many implementations described herein. Although FIGS. 1-3 illustrate the computing device and the vehicle interface device (FIGS. 2 and 3) outside the vehicle for simplicity, it is understood that the computing device and/or the vehicle interface device will be located within the vehicle during performance of various techniques described herein.

FIG. 1 illustrates computing device 106 communicatively coupled to vehicle computing device 102 via a wireless communication channel 104. The computing device 102 may be, for example, a laptop computing device, a tablet computing device, a mobile smartphone computing device, and/or a wearable apparatus of the user that includes a computing device (e.g., a watch having a computing device, glasses having a computing device, a virtual or augmented reality computing device, etc.). Additional and/or alternative client devices may be provided. In a variety of implementations, computing device 106 includes a variety of user interface input and/or output devices such as microphone(s), speaker(s), and/or additional user interface devices. The computing device 106 can be mounted within the vehicle (e.g., on a car mount, suctioned to a window) and/or can be powered and/or charged by vehicle provided auxiliary power (e.g., a 12 V vehicle receptacle, a USB port, or an auxiliary standard plug such as a "Type A" plug in the United States). However, the computing device 106 is not integrated with the vehicle and can be easily removed from the vehicle, easily placed in other vehicles, and can be a smartphone or other device that is utilized by a user in a variety of environments.

The vehicle computing device 102 of a vehicle may be, for example, an in-vehicle communications system, an in-vehicle entertainment system, and in-vehicle navigation system, etc. Additional and/or alternative vehicle computing devices may be provided. In various implementations, the vehicle computing device 102 is integrated with the vehicle and directly drives vehicle speaker(s) that are also integrated with the vehicle. The vehicle computing device 102 can be original equipment of the vehicle, or can be an after-market installed accessory. The vehicle computing device 102 is integrated in that it drives vehicle speaker(s) directly and/or cannot be removed from the vehicle without requiring usage of special tools and/or requiring significant time and/or expertise. For example, the vehicle computing device 102 can be connected to a controller area network (CAN) bus of the vehicle and/or can be powered via vehicle-specific connectors (e.g., not a 12 V vehicle receptacle and not a readily accessible auxiliary standard plug). In many implementations, vehicle computing device 102 may include a variety of user interface devices including microphone(s), speaker(s), and/or additional user interface devices. For example, audio output can be rendered via one or more vehicle speakers driven by the vehicle computing device.

Wireless communication channel 104 can include a variety of wireless communication networks that can optionally utilize one or more standard communication technologies, protocols, and/or inter-process communication techniques. For example, wireless communication channel 104 can be a Bluetooth channel 104, and a mobile smartphone computing device 106 can be communicatively coupled with a vehicle computing device 102 via a Bluetooth channel 104. As a further example, client device 106 can transmit an audio data stream to vehicle computing device 102 via Bluetooth channel 104, which can cause the vehicle computing device 102 to render corresponding audio output that can be captured by a microphone within the vehicle, and this captured data can be used to determine the vehicle audio delay.

FIG. 2 illustrates a computing device 206 communicatively coupled with vehicle computing device 202 via wireless communication network 204. Additionally, computing device 206 is communicatively coupled to vehicle interface device 210 via wireless communication network 208. As described above with respect to FIG. 1, computing device 206 can include a variety of computing devices, vehicle computing device 202 can include a variety of computing devices of a vehicle, and/or wireless communication channel 204 and 208 can include a variety of communication channels.

In a variety of implementations, computing device 206 can additionally and/or alternatively be coupled with vehicle interface device 210 via wireless communication channel 208. Vehicle interface device 210 can provide additional and/or alternative user interface input and/or output such as one or more additional microphones, one or more additional speakers, one or more additional buttons, etc. In a variety of implementations, vehicle interface device 210 can be powered using a 12 V vehicle receptacle (also referred to herein as a cigarette lighter receptacle), a vehicle USB port, a battery, etc. For example, vehicle interface device 210 can be powered by the vehicle's 12 V receptacle and can be positioned on or around the vehicle's center console (i.e., positioned near the driver of a vehicle such that one or more microphone(s) of vehicle interface device 210 can capture spoken utterance's provided by the driver and/or additional vehicle passengers). A computing device 206 such as a mobile smartphone can be communicatively coupled with vehicle interface device 210 via wireless communication channel 210. As a further example, mobile smartphone computing device 206 can be communicatively coupled with vehicle computing device 202 via a first Bluetooth channel 204, and computing device 206 can be communicatively coupled with vehicle interface device 210 via a second Bluetooth channel 208.

FIG. 3 illustrates an alternative configuration of a computing device communicatively coupled with a vehicle computing device as well as a vehicle interface device. Computing device 304, vehicle interface device 302, and/or vehicle interface device 308 are described above with respect to FIG. 1 and FIG. 2. In a variety of implementations, a vehicle is not communicatively coupled with the computing device via a wireless communication channel (e.g., the vehicle can lack the ability to connect with the computing device via a wireless communication channel). In some such implementations, computing device 304 can be communicatively coupled with vehicle interface device 308 via wireless communications channel 306. Additionally, vehicle interface device 308 can be communicatively coupled with vehicle computing device via communication channel 310. For example, a mobile smartphone (i.e., computing device 304) can be communicatively coupled with vehicle interface device 308 via a Bluetooth channel (i.e., wireless communication channel 306). Vehicle interface device 308 can additionally or alternatively be communicatively coupled with vehicle computing device 302 via an auxiliary cable (i.e., communication channel 310).

In a variety of implementations, a computing device (e.g., 106 of FIG. 1, 206 of FIG. 2, and/or 304 of FIG. 3), can automatically determine a vehicle device delay by transmitting an audio data stream to the vehicle computing device (e.g., 102 of FIG. 1, 202 of FIG. 2, and/or 302 of FIG. 3), and comparing captured audio output (rendered using one or more vehicle speakers) with the audio data stream. Audio data streams in accordance with many implementations are described herein with respect to FIG. 4. In many implementations, captured audio output rendered by a vehicle speaker can be captured using one or more microphones of a computing device and/or one or more microphones of a vehicle interface device.

In a variety of implementations, once a delay is determined, delay audio data can be appended onto future audio data streams, where the length of the delay audio data is determined using the determined delay. Additionally or alternatively, a determined delay can be utilized as part of a noise reduction process.

In many implementations, an audio data stream can be transmitted to determine whether audio output rendered via one or more vehicle speakers can be captured. In other words, a test audio signal can be transmitted to a vehicle computing device, and if the computing device and/or vehicle interface device are unable to capture audio output rendered via vehicle speaker(s), future audio data streams can be rendered using speaker(s) of the computing device and/or speaker(s) of the vehicle interface device.

It should be understood that while implementations described herein are directed to a computing device communicatively coupled with a vehicle computing device, additional or alternative computing devices can be coupled with the computing device. For example, the computing device can be communicatively coupled with the computing device of a standalone wireless speaker (e.g., a mobile smartphone communicatively coupled with a Bluetooth wireless speaker). A computing device can be coupled with additional and/or alternative additional computing devices.

Figure 4:
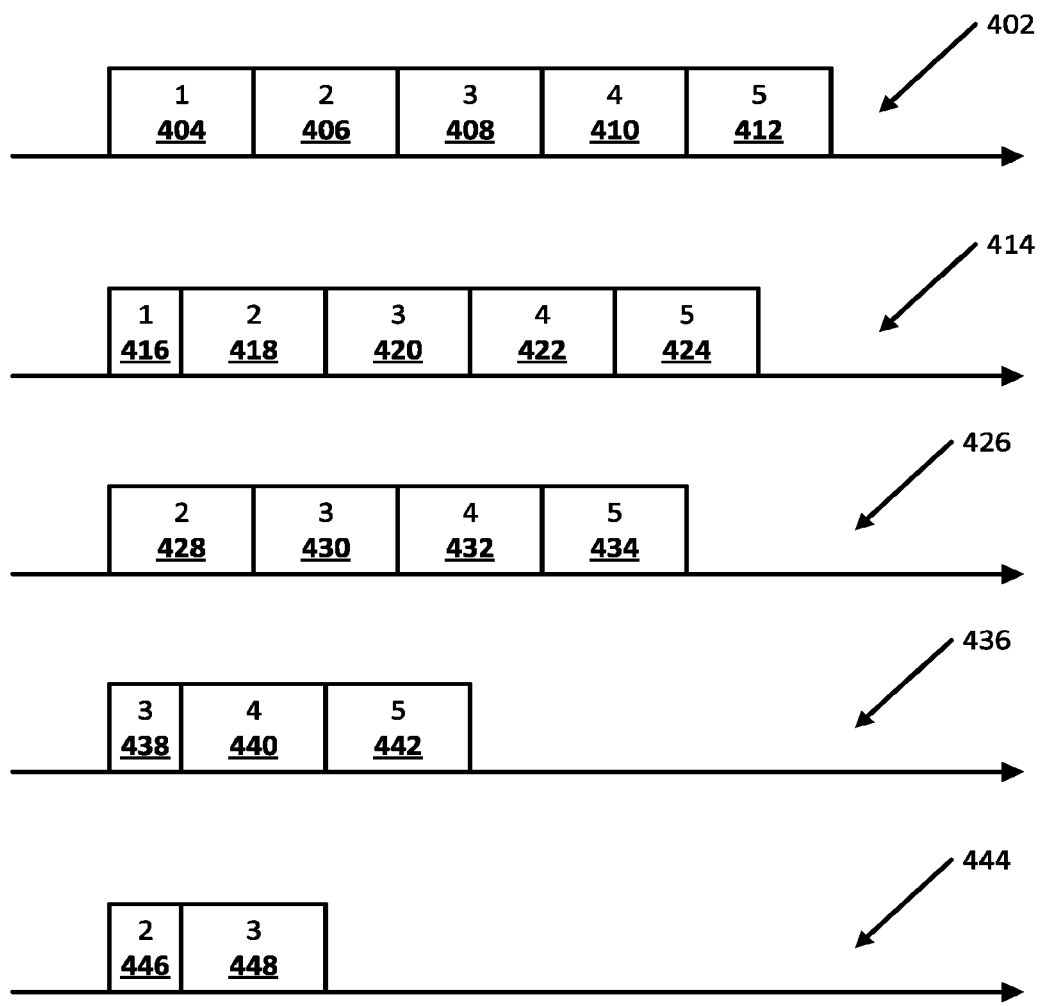
FIG. 4 illustrates an example audio data stream, and various examples of captured audio data in accordance with various implementations disclosed herein.

Turning to FIG. 4, an example audio data stream and a variety of captured audio data in accordance with various implementations is illustrated. Audio data stream 402 includes a sequence of five frequency segments: frequency segment '1' 404, frequency segment '2' 406, frequency segment '3' 408, frequency segment '4' 410, and frequency segment '5' 412. In many implementations, a computing device transmit audio data stream 402 to a vehicle computing device for rendering using vehicle speaker(s). In turn, the corresponding audio output rendered using the vehicle speaker(s) can be captured and compared to audio data 402 to determine any vehicle audio delay.

For example, a vehicle audio delay can be shorter than the first frequency segment. Captured audio data 414 illustrates a delay approximately half the length of the first frequency segment 404, and captures the sequence frequency segment '1' 416, frequency segment '2' 418, frequency segment '3'

420, frequency segment '4' 422, and frequency segment '5' 424. Because of the audio device delay, frequency segment '1' 416 of captured audio data 414 is shorter than frequency segment '1' 404 of audio data stream 402. In many implementations, a delay audio segment can be determined using the difference between the end of frequency segment '1' 416 and frequency segment '1' 404. Additional frequency segments 2, 3, 4, and/or '5' will have a similar delay, and computing device can additionally and/or alternatively determine a delay using the additional captured frequency segments. For instance, the audio data stream can be 2.5 seconds long and include be five 0.5 seconds long frequency segments. The captured audio data can capture 0.3 seconds of frequency segment '1' (i.e., the captured audio data can capture 2.3 seconds of the frequency segments). The computing device can compare frequency segment '1' 404 with frequency segment '1' 416 and determine a delay of 0.2 seconds. Similarly, frequency segment '2' 406 can be compared with frequency segment '2' 418 to determine a delay of 0.25 seconds, frequency segment '3' 408 can be compared with frequency segment '3' 420 to determine a delay of 0.2 seconds, frequency segment '4' 410 can be compared with frequency segment '4' 422 to determine a delay of 0.3 seconds, and frequency segment '5' 412 can be compared with frequency segment '5' 424 to determine a delay of 0.2 seconds. The computing device can select 0.3 seconds as the delay (i.e., 0.3 seconds is the largest delay in the determined delays of 0.2 seconds, 0.25 seconds, 0.2 seconds, 0.3 seconds, and 0.2 seconds).

In many implementations, an entire frequency segment(s) can be missing in the captured audio data. The system can compare the frequency segments in audio data stream 402 with captured audio data that captures a sequence of frequency segment '2' 428, frequency segment '3' 430, frequency segment '4' 432, and frequency segment '5' 434. In other words, frequency segment '1' 404 of audio data stream 402 does not have a corresponding representation in captured audio data stream 426. For example, audio data stream 402 can be 5 seconds long and include five 1 second frequency segments. The computing device can determine captured audio data stream 426 contains none of frequency segment '1' 404. The number of missing frequency segment(s) can be multiplied by the 1 second length of the frequency segments in audio data stream 402 to determine a 1 second delay.

In many implementations, entire frequency segment(s) can be missing as well as part(s) of frequency segments can be missing. Captured audio data 436 illustrates captured audio where frequency segment '1' and frequency segment '2' are missing in their entirety, and a portion of frequency segment '3' is missing. In other words, captured audio data 436 includes frequency segment '3' 438, frequency segment '4' 440, and frequency segment '5' 442, where frequency segment '3' 438 of captured audio data 436 is shorter than frequency segment '3' 408 of audio data stream 402. The device delay can be determined using a combination of the length of the missing frequency segment(s) as well as the missing portion of the first captured frequency segment as described above. For instance, audio data stream 402 can include five 0.3 second long frequency segments (i.e., audio data stream 402 is 1.5 seconds long). Captured audio data stream can capture only 0.7 seconds of audio data stream 402. A delay of 0.7 seconds can be determined by comparing captured audio data stream 436 with audio data stream 402 to determine a frequency segment corresponding to frequency segment '1' 404 and frequency segment '2' 406 are not captured in captured audio data stream 436. Additionally, by comparing frequency segment '3' 408 with captured frequency segment '3' 438, it can be determined only 0.1 seconds of frequency segment '3' 438 are captured. The computing device can determine the delay by combining the delay of the missing frequency segments (0.3 seconds from missing frequency segment '1'+0.3 seconds from missing frequency segment '2') with the delay of the first captured frequency segment '3' 438 (0.2 seconds) to determine a 0.8 second delay (0.3+0.3+0.2).

Additionally or alternatively, the captured audio data can be missing portions of both the beginning and the end of the audio data stream. For example, captured audio data 444 includes frequency segment '2' 446 and frequency segment '3' 448, where frequency segment '2' 446 is shorter than frequency segment '2' 406 of audio data stream 402. In other words, frequency segments '1', '4', and '5' are completely missing and a portion of frequency segment '2' is missing in captured audio data 444. A first vehicle delay can be determined based on missing frequency segment '1' and portion of missing frequency segment '2'. Additionally or alternatively, a second vehicle delay can be determined based on missing frequency segments '4' and '5'. For example, audio data stream 402 can include five frequency segments each 1 second long (i.e., audio data stream is 5 seconds long). Audio data stream 402 can be compared with captured audio data stream 444 to determine captured audio data stream 444 does not capture frequency segments corresponding to frequency segment '1' 404, frequency segment '4' 410, and frequency segment '5' 412. Additionally, by comparing captured frequency segment '2' 446 with frequency segment '2' 406 and captured frequency segment '3' 448 with frequency segment '3' 408, an additional 0.4 second delay can be determined. A first audio delay occurring at the beginning of the captured audio data stream can be determined to be 1.4 seconds by combining the delay of captured frequency segment '2' (0.4 seconds) with the length of missing frequency segment '1' (1 second). Additionally or alternatively, a second audio delay occurring at the end of the captured audio data stream of 2 seconds can be determined by combining the length of missing frequency segment '4' (1 second) and missing frequency segment '5' (1 second).

While a specific sequence of frequency segments is described with respect to FIG. 4, a variety of audio data streams (and corresponding captured audio data) can be utilized in accordance with many implementations. For example, an audio data stream can be a segment of a single frequency. For instance, the audio data stream can be an 8 second long segment of a single frequency, the captured audio data can capture only 6.5 seconds of the single frequency, and a vehicle audio delay of 1.5 seconds can be determined based on comparing the anticipated duration of the segment (8 seconds) to the actual duration in the captured audio data (6.5 seconds). As another example, each frequency segment can be several co-occurring frequencies (e.g., dual tone co-occurring frequencies, tri tone co-occurring frequencies, etc.). In many implementations, a sequence of frequency segments includes a non-repeating sequence of frequency segments. In many implementations, a sequence of frequency segments include repeating frequency segments where missing frequency segments are uniquely identifiable. For example, a sequence can be frequency segment representations of '1', '2', '3', '4', '5', '4', '3', '2', '1'. Audio data streams can be a variety of lengths, such as 0.5 seconds, 1 second, 1.5 seconds, 2 seconds, etc.

Figure 5:
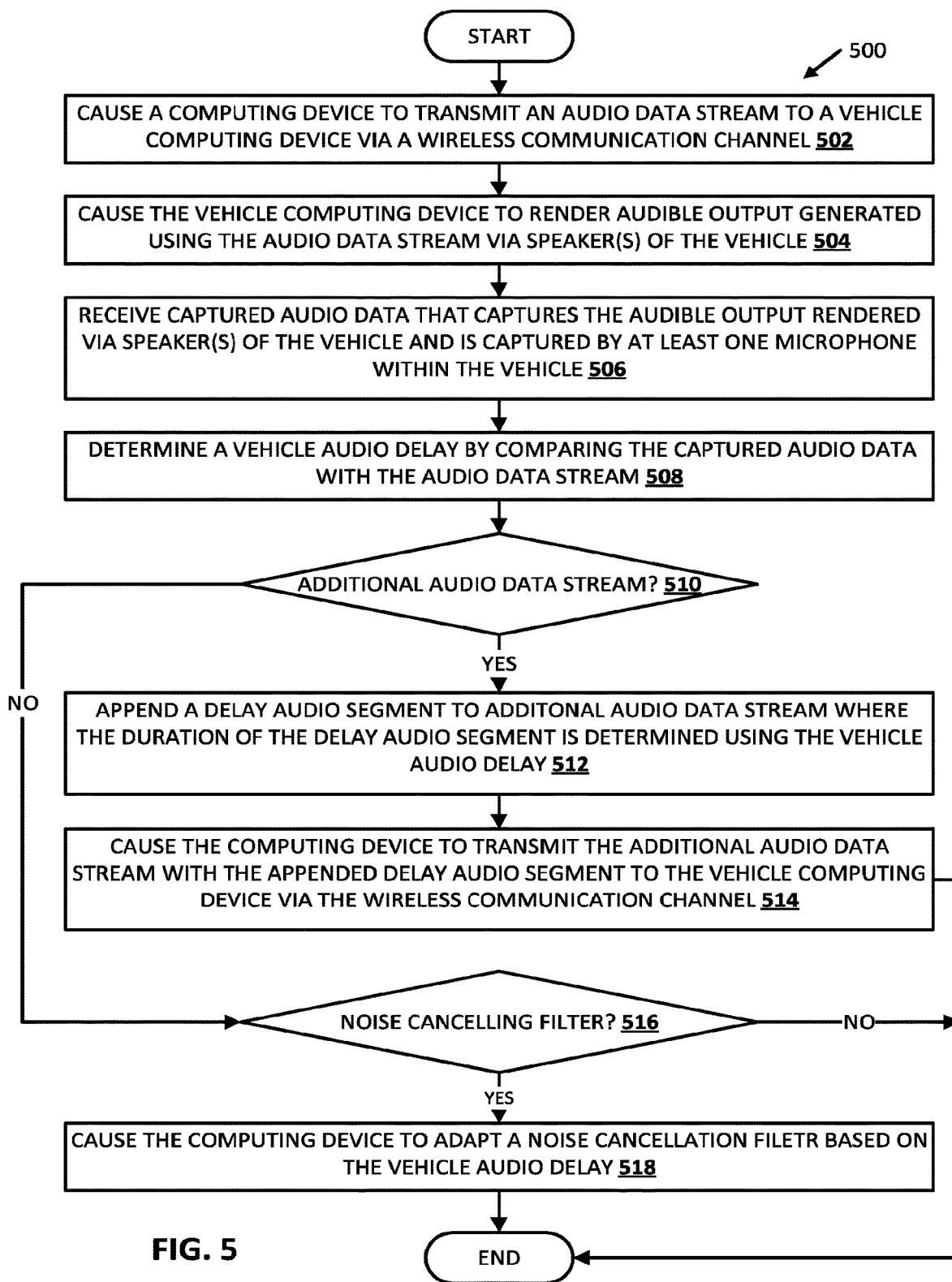
FIG. 5 is a flowchart illustrating an example process in accordance with various implementations disclosed herein.

Turning to FIG. 5, an example process 500 is illustrated of determining a vehicle audio delay according to implementations disclosed herein. For convenience, the operations of certain aspects of the flowchart of FIG. 5 are described with reference to a system that performs the operations This system may include various components of various computer systems and/or one or more of GPU(s), CPU(s), and/or TPU(s). For example, the system can include a smartphone or other computing device, and/or a vehicle interface device. Moreover, while the operations of process 500 are shown in a particular order, this is not meant to be limiting. One or more operations may be reordered, omitted, and/or added.

At block 502, the system causes a computing device to transmit an audio data stream to a vehicle computing device via a wireless communication channel. For example, a mobile smartphone can transmit an audio data stream to a vehicle computing device via Bluetooth. As another example, a mobile smartphone can transmit an audio data stream to a vehicle interface device via Bluetooth, and the vehicle interface device can transmit the audio data stream to the vehicle computing device. As yet a further example, a vehicle interface device can transmit an audio data stream to a vehicle computing device via Bluetooth and/or a wired communication channel.

At block 504, the system causes the vehicle computing device to render audible output generated using the audio data stream via one or more speakers of the vehicle, where the one or more speakers of the vehicle are driven by the vehicle computing device. For example, a vehicle computing device can drive vehicle speakers, integrated with the vehicle, based on all or portions of the audio data stream, thereby causing the vehicle speakers to render corresponding audible output. As described herein, if the vehicle computing device does not have a delay, the corresponding audible output will include the entirety of the audio data stream. However, if the vehicle computing device does have a delay, the corresponding audible output can omit one or more portions of the audio data stream.

At block 506, the system receives captured audio data that captures the audible output rendered via one or more speakers of the vehicle. The captured audio data is captured by at least one microphone within the vehicle. In some implementations, the at least one microphone within the vehicle includes a microphone of a computing device, such as the computing device that transmitted the audio data stream in block 502. In some implementations, the at least one microphone within the vehicle additionally or alternatively includes a microphone of a vehicle interface device, and the vehicle interface device can be separate from the computing device that transmitted the audio data stream in block 502. Additionally or alternatively, audible output can be captured by both at least one microphone of a computing device as well as at least one microphone of a vehicle interface device.

At block 508, the system determines a vehicle audio delay by comparing the captured audio data with the audio data stream. Some non-limiting examples of determining a vehicle audio delay are described herein (e.g., above with respect to FIG. 4).

At block 510, the system determines whether there is additional audio data stream to transmit to the vehicle computing device. In many implementations, an automated assistant client of the computing device generates the additional audio data stream. In many implementations, an automated assistant client of a vehicle interface device generates the additional audio data stream. If so, the system proceeds to block 512, and the system appends a delay audio segment to the additional audio data stream, where the duration of the delay audio segment is determined using the vehicle audio delay. In a variety of implementations, a delay audio segment can include a variety of audio including white noise, a high frequency segment of sound inaudible to a human, as well as additional other sounds. The delay audio segment can be a single length that is repeated as necessary (i.e., a 0.2 delay audio segment can be appended once for a 0.1 second delay as well as a 0.2 second delay, the 0.2 delay audio data segment can be appended twice for a 0.3 second delay and a 0.4 second delay, etc.). Additionally or alternatively, the length of the delay audio segment may be customized to the determined audio delay (i.e., a 0.5 second delay audio segment can be appended when a 0.5 second delay is determined, a 0.75 second delay audio segment can be appended when a 0.75 delay is determined, etc.). Furthermore, a delay audio segment slightly longer than the determined audio delay can be appended (i.e., a 0.3 second delay audio segment can be appended when a 0.25 second audio delay is determined, a 0.75 second delay audio segment can be appended when a 0.5 second audio delay is determined, etc.).

At block 514, the system causes the computing device to transmit the additional audio stream with the appended delay audio segment to the vehicle computing device via the wireless communication channel. Once the system has transmitted the additional audio data stream, the process ends.

If at block 510, the system determines there is not an additional audio data stream to transmit to the vehicle computing device, the system proceeds to block 516, where the system determines whether there is a noise cancelling filter. If the system determines there is not a noise cancelling filter, the processes ends. If at block 516, the system determines there is a noise cancelling filter, the system proceeds to block 518 where the system causes the computing device to adapt a noise cancellation filter based on the vehicle audio delay before the process ends. In many implementations, the noise cancelling filter is stored locally on the computing device. In many implementations, the noise cancelling filter is stored at a separate computing device (e.g., a separate vehicle interface device). If the noise cancelling filter is stored at the separate computing device, block 512 can comprise transmitting, to the separate computing device, data that is based on the vehicle audio delay and that causes the separate computing device to adapt its local noise cancelling filter based on the vehicle audio delay.

FIG. 5 illustrates a process that includes both appending a delay audio segment based on a determined vehicle audio delay, and adapting a noise cancelling filter based on a determined vehicle audio delay. However, as described herein, in various implementations delay audio segments can be appended without any adaptation of a noise cancelling filter, or adaptation of a noise cancelling filter can occur without any appending of delay audio segments.

Figure 6:
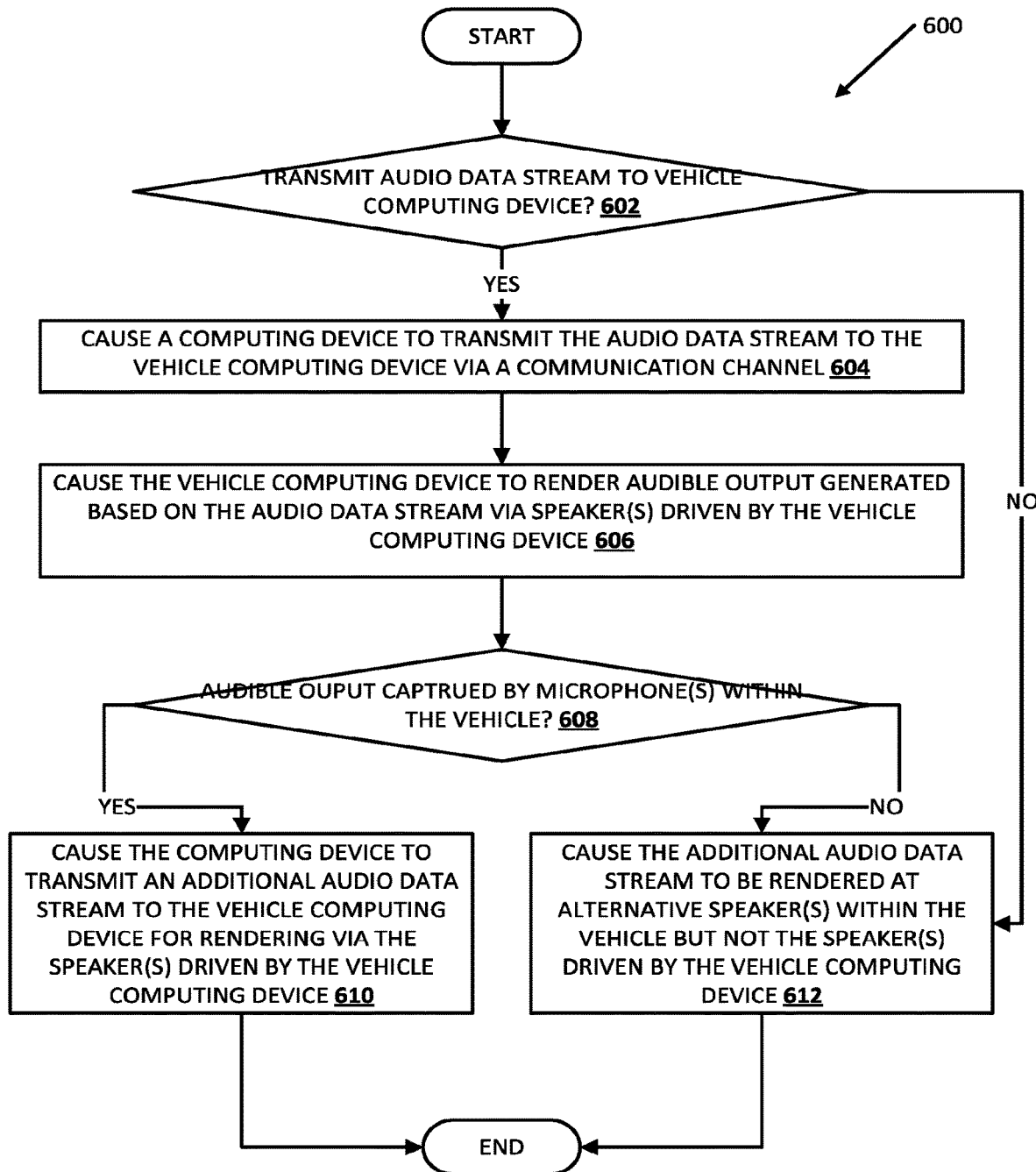
FIG. 6 illustrates a flowchart illustrating another example process in accordance with various implementations disclosed herein.

Turning to FIG. 6, an example process 600 is illustrated of determining whether one or more speakers driven by a vehicle computing device render audible output generated using an audio data stream in accordance with implementations disclosed herein. For convenience, the operations of certain aspects of the flowchart of FIG. 6 are described with reference to a system that performs the operations This system may include various components of various computer systems and/or one or more of GPU(s), CPU(s), and/or TPU(s). For example, the system can include a smartphone or other computing device, and/or a vehicle interface device. Moreover, while the operations of process 600 are shown in a particular order, this is not meant to be limiting. One or more operations may be reordered, omitted, and/or added.

At block 602, the system determines whether to transmit an audio data stream from a computing device to a vehicle computing device via a communication channel. In many implementations, the system determines whether the vehicle is a communication channel mode (i.e., whether the vehicle is in a Bluetooth mode, whether the vehicle supports automatic switching to the Bluetooth mode, etc.). In many implementations, the system determines whether the volume of one or more speakers driven by the vehicle computing device is too low for rendered audio output to be captured via one or more microphones within the vehicle. If the system determines the vehicle is in a communication channel mode (or supports automatic switching to the communication channel mode), and the volume of speaker(s) driven by the vehicle computing device is not too low, the system proceeds to block 604. If the system determines the vehicle is not in a communication channel mode, or the system determines the volume of speaker(s) driven by the vehicle computing device is too low, the system proceeds to block 612.

At block 604, the system causes the computing device to transmit an audio data stream to a vehicle computing device via a communication channel. In some implementations, the communication channel is a wireless communication channel (e.g., a Bluetooth channel). In other implementations, the communication channel is a wired communication channel (e.g., an auxiliary cable).

At block 606, the system causes the vehicle computing device to render audible output generated based on the audio data stream via one or more speakers driven by the vehicle computing device.

At block 608, the system determines whether the audible output is captured by at least one microphone within the vehicle. If the system determines the audible output is captured by the at least one microphone, the system proceeds to block 610. If the system determines the audible output is not captured by the least one microphone, the system proceeds to block 612. In many implementations, the audible output is captured by at least one microphone of a computing device. In many implementations, the audible output is captured by at least one microphone of a vehicle interface device. In many implementations, the audible output is captured by at least one microphone of a computing device and at least one microphone of a vehicle interface device.

At block 610, the system causes the computing device to transmit an additional audio data stream to the vehicle computing device for rendering via the one or more speakers driven by the vehicle computing device.

At block 612, the system causes the additional audio data stream to be rendered at one or more alternative speakers within the vehicle, where the one or more alternative speakers are not driven by the vehicle computing device. In many implementations, the one or more alternative speakers are speaker(s) of a computing device. In many implementations, the one or more alternative speakers are speaker(s) of a vehicle interface device.

Figure 7:
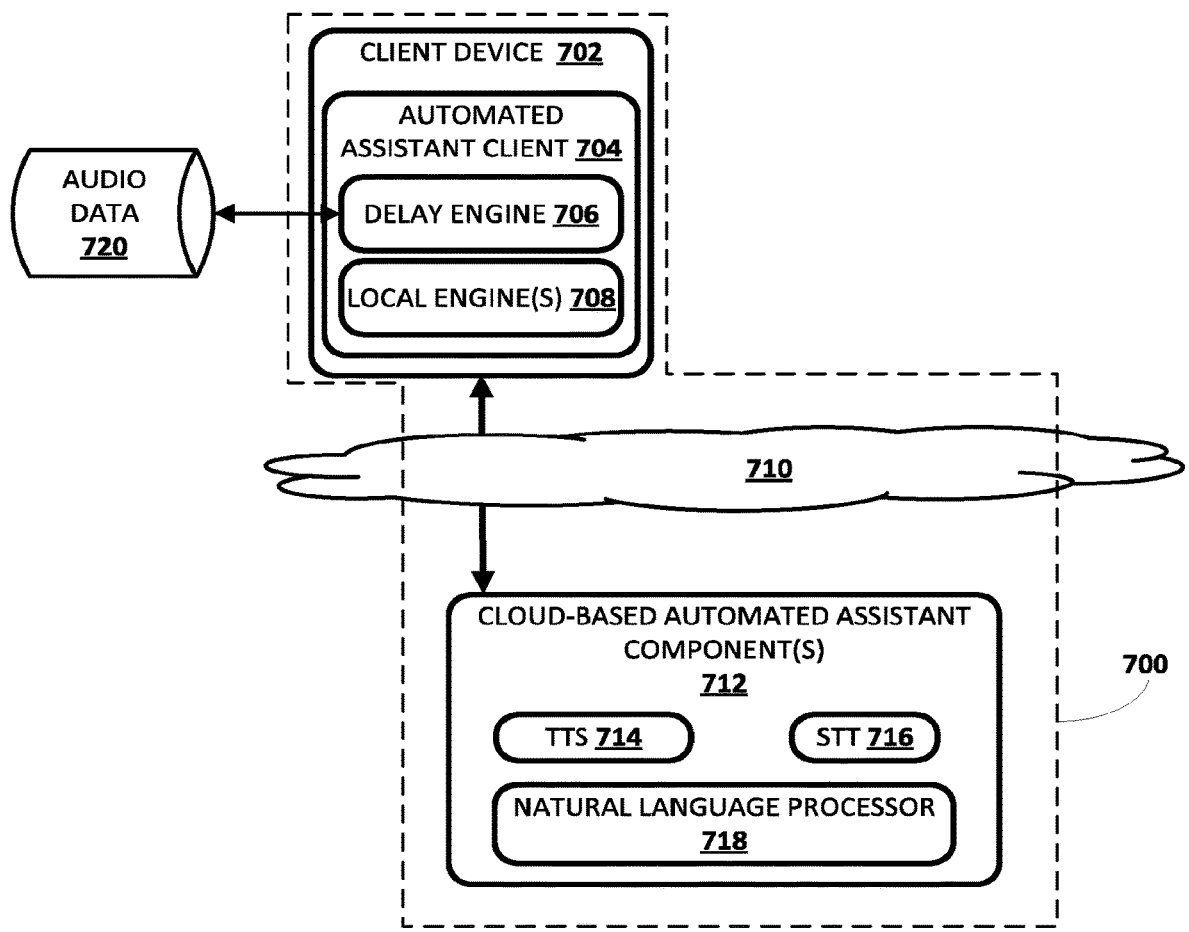
FIG. 7 is a block diagram illustrating an example environment where various implementations disclosed herein can be implemented.

Turning to FIG. 7, an example environment in which implementations disclosed herein can be implemented. FIG. 7 includes a client computing device 702, which execute an instance of an automated assistant client 704. One or more cloud-based automated assistant components 712 can be implemented on one or more computing systems (collectively referred to as a "cloud" computing system) that are communicatively coupled to client device 702 via one or more local and/or wide area networks (e.g., the Internet) indicated generally at 710.

An instance of an automated assistant client 704, by way of its interactions with one or more cloud-based automated assistant components 712, may form what appears to be, from the user's perspective, a logical instance of an automated assistant 700 with which the user may engage in a human-to-computer dialog. It thus should be understood that in some implementations, a user that engages with an automated assistant client 704 executing on client device 702 may, in effect, engage with his or her own logical instance of an automated assistant 700. For the sakes of brevity and simplicity, the term "automated assistant" as used herein as "serving" a particular user will often refer to the combination of an automated assistant client 704 executing on a client device 702 operated by the user and one or more cloud-based automated assistant components 712 (which may be shared amongst multiple automated assistant clients of multiple client computing devices). It should also be understood that in some implementations, automated assistant 700 may respond to a request from any user regardless of whether the user is actually "served" by that particular instance of automated assistant 700.

The client computing device 702 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 702 may be distributed between multiple computing devices. For example, one or more operations of client computing device 702 may be distributed between a mobile smartphone and a vehicle computing device. Furthermore, operations of client computing device 702 may be repeated between multiple computing devices (which in some cases may be communicatively coupled). As a further example, a mobile smartphone as well as a vehicle interface device may each implement operations of automated assistant 700, such as a mobile smartphone and a vehicle interface device both including an invocation engine (described below). In various implementations, the client computing device 702 may optionally operate one or more other applications that are in additional to automated assistant client 704, such as a message exchange client (e.g., SMS, MMS, online chat), a browser, and so forth. In some of those various implementations, one or more of the other applications can optionally interface (e.g. via an application programming interface) with the automated assistant 704, or include their own instance of an automated assistant application (that may also interface with the cloud-based automated assistant component(s) 712).

Automated assistant 700 engages in human-to-computer dialog sessions with a user via user interface input and output devices of the client device 702. To preserve user privacy and/or to conserve resources, in many situations a user must often explicitly invoke the automated assistant 700 before the automated assistant will fully process a spoken utterance. The explicit invocation of the automated assistant 700 can occur in response to certain user interface input received at the client device 702. For example, user interface inputs that can invoke the automated assistant 700 via the client device 702 can optionally include actuations of a hardware and/or virtual button of the client device 702. Moreover, the automated assistant client can include one or more local engines 708, such as an invocation engine that is operable to detect the presence of one or more spoken invocation phrases. The invocation engine can invoke the automated assistant 700 in response to detection of one or more of the spoken invocation phrases. For example, the invocation engine can invoke the automated assistant 700 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 702, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 700. As used herein, "invoking" the automated assistant 700 can include causing one or more previously inactive functions of the automated assistant 700 to be activated. For example, invoking the automated assistant 700 can include causing one or more local engines 708 and/or cloud-based automated assistant components 712 to further process audio data frames based on which the invocation phrase was detected, and/or one or more following audio data frames (whereas prior to invoking no further processing of audio data frames was occurring).

The one or more local engine(s) 708 of automated assistant 704 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 702 is relatively constrained in terms of computing resources (e.g., processor cycles, memory, battery, etc.), the local engines 108 may have limited functionality relative to any counterparts that are included in cloud-based automated assistant components 712.

Automated assistant client 704 can additionally include delay engine 706 and audio data 720. Delay engine 706 can be utilized by automated assistant client 704 in accordance with a variety of implementations including: transmitting an audio data stream to a vehicle computing device, transmitting an audio data stream to a vehicle interface device, determining a vehicle device delay, appending an audio delay segment to an audio data stream, transmitting a vehicle device delay to a vehicle interface device, capturing audio data rendered using vehicle speaker(s), etc. In many implementations, delay engine 706 can select an audio data stream from audio data database 720.

Cloud-based automated assistant components 712 leverage the virtually limitless resources of the cloud to perform more robust and/or more accurate processing of audio data, and/or other user interface input, relative to any counterparts of the local engine(s) 708. Again, in various implementations, the client device 702 can provide audio data and/or other data to the cloud-based automated assistant components 712 in response to the invocation engine detecting a spoken invocation phrase, or detecting some other explicit invocation of the automated assistant 700.

The illustrated cloud-based automated assistant components 712 include a cloud-based TTS module 714, a cloud-based STT module 716, and a natural language processor 718. In some implementations, one or more of the engines and/or modules of automated assistant 700 may be omitted, combined, and/or implemented in a component that is separate from automated assistant 700. Further, in some implementations automated assistant 700 can include additional and/or alternative engines and/or modules.

Cloud-based STT module 716 can convert audio data into text, which may then be provided to natural language processor 718. In various implementations, the cloud-based STT module 716 can covert audio data into text based at least in part on indications of speaker labels and assignments that are provided by an assignment engine (not illustrated).

Cloud-based TTS module 714 can convert textual data (e.g., natural language responses formulated by automated assistant 700) into computer-generated speech output. In some implementations, TTS module 714 may provide the computer-generated speech output to client device 702 to be output directly, e.g., using one or more speakers. In other implementations, textual data (e.g., natural language responses) generated by automated assistant 700 may be provided to one of the local engine(s) 708, which may then convert the textual data into computer-generated speech that is output locally.

Natural language processor 718 of automated assistant 700 processes free form natural language input and generates, based on the natural language input, annotated output for use by one or more other components of the automated assistant 700. For example, the natural language processor 718 can process natural language free-form input that is textual input that is a conversion, by STT module 716, of audio data provided by a user via client device 702. The generated annotated output may include one or more annotations of the natural language input and optionally one or more (e.g., all) of the terms of the natural language input. In some implementations, the natural language processor 718 is configured to identify and annotate various types of grammatical information in natural language input. For example, the natural language processor 718 may include a part of speech tagger (not depicted) configured to annotate terms with their grammatical roles. Also, for example, in some implementations the natural language processor 718 may additionally and/or alternatively include a dependency parser (not depicted) configured to determine syntactic relationships between terms in natural language input.

In some implementations, the natural language processor 718 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 718 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 718 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 718 may rely on annotations from one or more other components of the natural language processor 718. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 718 may use related prior input and/or other related data outside of the particular natural language input to determine one or more annotations.

Figure 8:
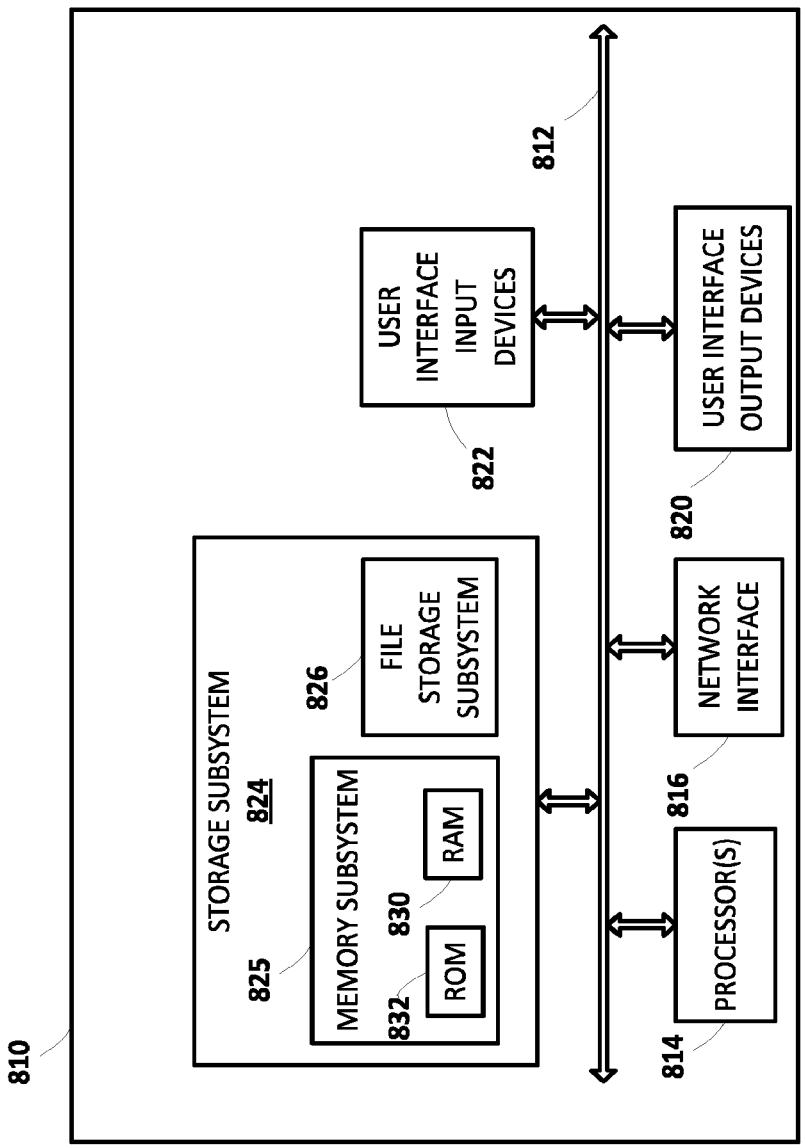
FIG. 8 illustrates an example architecture of a computing device.

FIG. 8 is a block diagram of an example computing device 810 that may optionally be utilized to perform one or more aspects of techniques described herein. In some implementations, one or more of a client computing device, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more of the processes of FIGS. 5 and/or 6, as well as to implement various components depicted in FIG. 7.

These software modules are generally executed by processor 814 alone or in combination with other processors. Memory 825 used in the storage subsystem 824 can include a number of memories including a main random access memory ("RAM") 830 for storage of instructions and data during program execution and a read only memory ("ROM") 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, a method implemented by one or more processors is provided that includes causing a computing device to transmit, via a wireless communication channel, an audio data stream to a vehicle computing device of a vehicle, where transmitting the audio data stream causes the vehicle computing device to render audible output via one or more vehicle speakers of the vehicle, and where the audible output is generated by the vehicle computing device based on at least part of the audio data stream. The method further includes, receiving captured audio data that is captured by at least one microphone within the vehicle, wherein the captured audio data captures the audible output rendered by the at least one vehicle speaker. The method further includes determining a vehicle audio delay based on comparing the captured audio data to the audio data stream. The method further includes, in response to determining the vehicle audio delay, causing the computing device to append a corresponding delay audio segment to an additional audio data stream prior to transmitting the additional audio data stream to the vehicle computing device via the wireless communication channel, where the duration of the delay audio segment is determined using the vehicle audio delay.

These and other implementations of the technology disclosed herein can include one or more of the following features.

In some implementations, determining the vehicle audio delay based on comparing the captured audio data to the audio data stream includes determining a temporal indication of a particular feature in the captured audio data. In some of those implementations, the method further includes determining an additional temporal indication of the particular feature in the audio data stream. In some of those implementations, the method further includes determining the vehicle audio delay based on a difference between the temporal indication of the particular feature in the captured audio data and the additional temporal indication of the particular feature in the audio data stream. In some versions of those implementations, the audio data stream includes a defined sequence of frequency segments, wherein the particular feature is a particular frequency segment of the defined sequence of frequency segments. In some versions of those implementations, each of the frequency segments of the sequence of frequency segments comprise at least two corresponding co-occurring frequencies.

In some implementations, determining the temporal indication of the particular feature in the captured audio data includes determining a captured position of the particular frequency segment in the captured audio data, where determining the additional temporal indication of the particular feature in the audio data stream comprises. In some versions of those implementations, the method further includes determining a stream position of the particular frequency segment in the audio data stream. In some versions of those versions, determining the vehicle audio delay based on the difference between the temporal indication of the particular feature in the captured audio data and the additional temporal indication of the particular feature in the audio data stream includes determining that the captured position of the particular frequency segment indicates that it is the initially occurring frequency segment in the captured audio data and the stream position of the particular frequency segment in the audio data stream indicates it is not the initially occurring frequency segment in the audio data stream, where determining the difference between the temporal indication of the particular feature in the captured audio data and the additional temporal indication of the particular feature in the audio data stream comprises determining a positional offset between the captured position and the stream position.

In some implementations, determining the vehicle audio delay based on comparing the captured audio data to the audio data stream includes, for each of a plurality of frequency segments in the sequence of frequency segments, determining a corresponding temporal offset between the frequency segment in the captured audio data and the frequency segment in the audio data stream. In some versions of those implementations, determining the vehicle audio delay based on the largest offset of the corresponding temporal offsets.

In some implementations, causing the computing device to append the corresponding delay audio segment to an additional data stream prior to transmitting the additional data stream to the vehicle computing device via the wireless communication channel includes causing the computing device to append the corresponding delay audio segment to the beginning of the additional data stream.

In some implementations, causing the computing device to append the corresponding delay audio segment to an additional data stream prior to transmitting the additional data stream to the vehicle computing device via the wireless communication channel includes causing the computing device to append the corresponding delay audio segment to the end of the additional data stream.

In some implementations, the wireless communication channel is a Bluetooth channel.

In some implementations, the computing device includes an automated assistant client. In some versions of those implementations, the additional audio data stream is transmitted to the vehicle computing device in response to the automated assistant client receiving spoken input via the one or more microphones, and where the additional audio data stream is an automated assistant response that is generated responsive to the spoken input. In some versions of those implementations, the at least one microphone that captures the captured audio data comprises at least one computing device microphone of the computing device. In some versions of those implementations, the at least one microphone that captures the captured audio data comprises at least one interface microphone of a vehicle interface device in communication with the computing device via a second wireless communication channel, and where receiving the captured audio data includes receiving the captured audio data from the vehicle interface device via the second communication channel.

In some implementations, the vehicle interface device is communicatively coupled to the vehicle computing device via an additional wireless communication channel.

In some implementations, the vehicle interface device is communicatively coupled to the vehicle computing device via a wired communication channel.

In some implementations, the method further includes causing the vehicle interface device to adapt a local noise cancellation filter based on the vehicle audio delay.

In some implementations, a method implemented by one or more processors includes causing a computing device to transmit, via a communication channel, an audio data stream to a vehicle computing device of a vehicle, where transmitting the audio data stream causes the vehicle computing device to render audible output via one or more vehicle speakers driven by the vehicle computing device when the vehicle computing device is in a communication channel mode, and where the audible output is generated by the vehicle computing device based on at least part of the audio data stream. The method further includes determining whether the audible output is captured by at least one microphone within the vehicle. The method further includes, in response to determining the audible output is captured by the at least one microphone within the vehicle, causing the computing device to transmit an additional audio data stream to the vehicle computing device via the communication channel for rendering of the additional audio data stream, by the vehicle computing device, via the one or more vehicle speakers. In response to determining the audible output is not captured by the at least one microphone within the vehicle, the method further includes causing the additional audio data stream to instead be rendered at one or more alternative speakers, wherein the one or more alternative speakers are within the vehicle but are not the one or more vehicle speakers driven by the vehicle computing device.

These and other implementations of the technology disclosed herein can include one or more of the following features.

In some implementations, the one or more alternative speakers are of the computing device. In some versions of those implementations, the method further includes detecting an invocation of an automated assistant client of the computing device, where the invocation causes the automated assistant client to transition from a first state to a second state, where causing the computing device to transmit the audio data stream to the vehicle computing device of the vehicle comprises is responsive to detecting the invocation.

In some implementations, detecting the invocation includes detecting occurrence of an invocation phrase in audio data captured via at least one microphone of the computing device.

In some implementations, detecting the invocation includes detecting the invocation based on receiving, from a vehicle interface device over an additional communications channel, an indication of the invocation, where the vehicle interface device transmits the indication of the invocation responsive to user interaction with a hardware interface element or responsive to detecting occurrence of an invocation phrase in audio data captured via at least one microphone of the vehicle interface device.

In some implementations, causing the computing device to transmit the audio data stream to the vehicle computing device is responsive to user interface input directed to an automated assistant client of the computing device, and further includes transmitting, to a remote server device, a request that includes the user interface input and/or additional data based on the user interface input. In some versions of those implementations, receiving the additional audio data stream from the remote server device responsive to transmitting the request, where transmitting the audio data stream to the vehicle computing device occurs prior to receiving an entirety of the additional audio data stream from the remote server device.

In some implementations, the at least one microphone with the vehicle includes at least one microphone of the computing device.

In some implementations, the method further includes determining a temporal indication indicating a time the automated assistant client caused the computing device to transmit, via the communication channel, the audio data stream to the vehicle computing device of the vehicle. In some versions of those implementations, the method further includes determining a current temporal indication indicating a current time. In some versions of those implementations, the method further includes determining a difference between the current temporal indication and the temporal indication. In response to determining the difference between the current temporal indication and the temporal indication exceeds a threshold value, some versions of those implementations further include causing the automated assistant client of the computing device to transmit, via the communication channel, a second audio data stream to the vehicle computing device of the vehicle, where transmitting the second audio data stream causes the vehicle computing device to render additional audible output via the one or more speakers of the vehicle computing device when the vehicle computing device is in the communication channel mode, and where the additional audible output is generated by the vehicle computing device based on at least part of the second audio data stream. In some versions of those implementations, the method further includes determining whether the additional audible output is captured by the at least one microphone within the vehicle. In some versions of those implementations, in response to determining the additional audible output is captured by the at least one microphone within the vehicle. In some versions of those implementations, the method further includes causing the computing device to transmit a third audio data stream to the vehicle computing device via the communication channel. In response to determining the additional audible output is not captured by the at least one microphone within the vehicle, in some versions of those implementations, the method further includes causing third audible output to be rendered at the one or more alternative speakers.

In some implementations, a method implemented by one or more processors includes causing an audio data stream to be transmitted, via a wireless communication channel, to a vehicle computing device of a vehicle, where transmitting the audio data stream causes the vehicle computing device to render audible output via one or more vehicle speakers of the vehicle, and where the audible output is generated by the vehicle computing device based on at least part of the audio data stream. In some of those implementations, the method further includes receiving captured audio data that is captured by at least one microphone of a computing device within the vehicle, where the captured audio data captures the audible output rendered by the at least one vehicle speaker. In some of those implementations, the method further includes determining a vehicle audio delay based on comparing the captured audio data to the audio data stream. In some versions of those implementations, in response to determining the vehicle audio delay, the method further includes causing the computing device to adapt local noise cancellation based on the vehicle audio delay.

These and other implementations of the technology disclosed herein can include one or more of the following features.

In some implementations, the local noise cancellation mitigates, from subsequently captured audio data, a known source audio data stream that is transmitted via the wireless communication channel for rendering by the vehicle computing device via the one or more vehicle speakers, and where adapting the local noise cancellation includes adapting, based on the vehicle audio delay, an expected time of detecting the known source audio data stream.

In some implementations, the computing device is a vehicle interface device powered by a cigarette lighter receptacle of the vehicle. In some versions of those implementations, determining the vehicle audio delay is by the vehicle interface device. In some versions of those implementations, determining the vehicle audio delay is by a smartphone in communication with the vehicle interface device via a communication channel, and where causing the computing device to adapt the local noise cancellation based on the vehicle audio delay includes transmitting, to the vehicle interface device, the vehicle audio delay and/or additional data determined based on the vehicle audio delay.

In some implementations, a method implemented by one or more processors is provided that includes causing a computing device to transmit, via a wireless communication channel, an audio data stream to an additional computing device, where transmitting the audio data stream causes the additional computing device to render audible output via one or more additional speakers driven by the additional computing device, and where the audible output is generated by the additional computing device based on at least part of the audio data stream. The method further includes, receiving captured audio data that is captured by at least one microphone, wherein the captured audio data captures the audible output rendered by the at least one additional speaker. The method further includes determining an audio delay based on comparing the captured audio data to the audio data stream. The method further includes, in response to determining the audio delay: causing the computing device to append a corresponding delay audio segment to an additional audio data stream prior to transmitting the additional audio data stream to the additional computing device via the wireless communication channel, where the duration of the delay audio segment is determined using the audio delay; and/or adapt local noise cancellation based on the audio delay.

These and other implementations of the technology disclosed herein can include one or more of the following features.

The additional computing device can be a vehicle computing device, and the one or more speakers can be one or more vehicle speakers.

The additional computing device can be a Bluetooth enabled device that incorporates the one or more additional speakers or that is directly coupled to the one or more additional speakers via an audio cable.

In some implementations, a method implemented by one or more processors is provided that includes causing a computing device to transmit, via a communication channel, an audio data stream to an additional computing device, where transmitting the audio data stream causes the vehicle computing device to render audible output via one or more additional speakers driven by the additional computing device when the additional computing device is in a communication channel mode, and where the audible output is generated by the additional computing device based on at least part of the audio data stream. The method further includes determining whether the audible output is captured by at least one microphone. In response to determining the audible output is captured by at least one microphone, the method further includes determining an audio delay based on comparing the captured audio data to the audio data stream. The method further includes, in response to determining the audible output is captured by the at least one microphone, causing the computing device to transmit an additional audio data stream to the additional computing device via the communication channel for rendering of the additional audio data stream, by the vehicle computing device, via the one or more additional speakers. In response to determining the audible output is not captured by the at least one microphone, the method further includes causing the additional audio data stream to instead be rendered at one or more alternative speakers, wherein the one or more alternative speakers are not the one or more vehicle speakers driven by the additional computing device.

These and other implementations of the technology disclosed herein can include one or more of the following features.

The additional computing device can be a vehicle computing device, and the one or more speakers can be one or more vehicle speakers.

The additional computing device can be a Bluetooth enabled device that incorporates the one or more additional speakers or that is directly coupled to the one or more additional speakers via an audio cable.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

What is claimed is:

1. A method implemented by one or more processors, the method comprising:
    detecting an invocation of an automated assistant client of a computing device, wherein the invocation causes the automated assistant client to transition from a first state to a second state;
    responsive to detecting the invocation, causing a computing device to transmit, via a communication channel, an audio data stream to a vehicle computing device of a vehicle,
        wherein transmitting the audio data stream causes the vehicle computing device to render audible output via one or more vehicle speakers, wherein the one or more vehicle speakers are driven by the vehicle computing device when the vehicle computing device is in a communication channel mode, and
        wherein the audible output is generated by the vehicle computing device based on at least part of the audio data stream;
    determining whether the audible output is captured by at least one microphone of a vehicle interface device within the vehicle, wherein the vehicle interface device is communicatively coupled to the computing device,
        in response to determining that the audible output is captured by the at least one microphone within the vehicle:
            causing the computing device to transmit an additional audio data stream to the vehicle computing device via the communication channel for rendering of the additional audio data stream, by the vehicle computing device, via the one or more vehicle speakers, and
        in response to determining that the audible output is not captured by the at least one microphone within the vehicle:
            causing the additional audio data stream to instead be rendered at one or more alternative speakers, wherein the one or more alternative speakers are within the vehicle but are not the one or more vehicle speakers driven by the vehicle computing device.

2. The method of claim 1, wherein the one or more alternative speakers are of the computing device.

3. The method of claim 1, wherein detecting the invocation comprises:
    detecting occurrence of an invocation phrase in audio data captured via at least one microphone of the computing device.

4. The method of claim 1, wherein detecting the invocation comprises:
    detecting the invocation based on receiving, from the vehicle interface device over an additional communications channel, an indication of the invocation,
    wherein the vehicle interface device transmits the indication of the invocation responsive to user interaction with a hardware interface element or responsive to detecting occurrence of an invocation phrase in audio data captured via the at least one microphone of the vehicle interface device.

5. The method of claim 1, wherein causing the computing device to transmit the audio data stream to the vehicle computing device is responsive to user interface input directed to an automated assistant client of the computing device, and further comprising:
    transmitting, to a remote server device, a request that includes the user interface input and/or additional data based on the user interface input; and
    receiving the additional audio data stream from the remote server device responsive to transmitting the request;
    wherein transmitting the audio data stream to the vehicle computing device occurs prior to receiving an entirety of the additional audio data stream from the remote server device.

6. The method of claim 1, wherein the at least one microphone within the vehicle includes at least one microphone of the computing device.

7. The method of claim 1, further comprising:
    determining a temporal indication indicating a time an automated assistant client caused the computing device to transmit, via the communication channel, the audio data stream to the vehicle computing device of the vehicle;
    determining a current temporal indication indicating a current time;

determining a difference between the current temporal indication and the temporal indication;

in response to determining the difference between the current temporal indication and the temporal indication exceeds a threshold value:

causing the automated assistant client of the computing device to transmit, via the communication channel, a second audio data stream to the vehicle computing device of the vehicle, wherein transmitting the second audio data stream causes the vehicle computing device to render additional audible output via the one or more speakers of the vehicle computing device when the vehicle computing device is in the communication channel mode, and wherein the additional audible output is generated by the vehicle computing device based on at least part of the second audio data stream;

determining whether the additional audible output is captured by the at least one microphone within the vehicle;

in response to determining the additional audible output is captured by the at least one microphone within the vehicle:

causing the computing device to transmit a third audio data stream to the vehicle computing device via the communication channel, and in response to determining the additional audible output is not captured by the at least one microphone within the vehicle, causing third audible output to be rendered at the one or more alternative speakers.

8. A smartphone comprising:

memory storing instructions;

one or more processors executing the stored instructions to:

detect an invocation of an automated assistant client of the smartphone, wherein the invocation causes the automated assistant client to transition from a first state to a second state;

transmit, via a communication channel between the smartphone and a vehicle computing device of a vehicle, an audio data stream to the vehicle computing device, wherein transmitting the audio data stream causes the vehicle computing device to render audible output via one or more vehicle speakers that are driven by the vehicle computing device when the vehicle computing device is in a communication channel mode, and wherein the audible output is generated by the vehicle computing device based on at least part of the audio data stream;

determine whether the audible output is captured by at least one microphone of a vehicle interface device within the vehicle, wherein the vehicle interface device is communicatively coupled to the computing device;

in response to determining that the audible output is captured by the at least one microphone within the vehicle:

transmit an additional audio data stream to the vehicle computing device via the communication channel for rendering of the additional audio data stream, by the vehicle computing device, via the one or more vehicle speakers, and in response to determining that the audible output is not captured by the at least one microphone within the vehicle:

instead render the additional audio data stream at one or more alternative speakers of the smartphone.

9. The smartphone of claim 8, wherein the at least one microphone within the vehicle comprises a smartphone microphone of the smartphone.

10. The smartphone of claim 8, wherein in detecting the invocation one or more of the processors are to:

detect occurrence of an invocation phrase in audio data captured via at least one smartphone microphone of the smartphone.

11. The smartphone of claim 8, wherein in detecting the invocation one or more of the processors are to:

detect the invocation based on receiving, from the vehicle interface device over an additional communications channel, an indication of the invocation, wherein the vehicle interface device transmits the indication of the invocation responsive to user interaction with a hardware interface element.

12. The smartphone of claim 8, wherein transmitting the audio data stream to the vehicle computing device is responsive to user interface input directed to an automated assistant client of the smartphone, and wherein in executing the stored instructions one or more of the processors are further to:

transmit, to a remote server device, a request that includes the user interface input and/or additional data based on the user interface input; and receive the additional audio data stream from the remote server device responsive to transmitting the request;

wherein transmitting the audio data stream to the vehicle computing device occurs prior to receiving an entirety of the additional audio data stream from the remote server device.

* * * * *